Patented Apr. 18, 1939

2,154,852

UNITED STATES PATENT OFFICE 2,154,852

PROCESS FOR THE OBTAINMENT OF ARTIFICIAL RUBBER

Ernst Kleiber, Lugano Via Trevano, Switzerland, assignor to Hevapar S. A., Geneva, Switzerland, a corporation of Switzerland No Drawing. Application July 6, 1936, Serial No. 89,245. In France April 11, 1936

10 Claims. (Cl. 106—23)

There exist, at the present time, many processes for the obtainment of an elastic product called "synthetic" or "artificial" rubber.

Most of these processes include the production of isoprene, butadiene or other ethyl hydrocarbons, the synthetic rubber resulting from the polymerization of these hydrocarbons.

The object of the present invention is to provide a process permitting of obtaining directly a plastic, elastic, and vulcanizable body having all the properties and the appearance of natural rubber, by starting, as raw material, from hydrocarbons, either saturated or not, either natural or synthetic, but having the physical and chemical properties of the natural products.

According to the present invention, I prepare, in an autoclave or another receiver provided with blade stirring means, a mixture of mineral oil and crushed crude sulphur. As oil, I may employ, for instance, crude or fractionate petroleum (that is to say, in particular, the derivatives and by-products of distillation and refining) and coal tar, either complete or fractionated.

After baking for a long time up to 112° C., or between 110 and 125° C. and even more, I add a resin (pitch, colophony, or resin oil, either raw or fractionate). After baking for some hours, diluted sulphuric acid is added, while stopping the heating. Near the end of the operation commercial concentrated hydrochloric acid is added and the whole is allowed to stay for forty-eight hours. After neutralization, I dry in a drying apparatus up to a temperature which may be as high as 102° C., through known drying methods.

The temperatures above indicated may be modified according to the pressures that are employed. In any case they may always be increased.

The mass that is obtained is in the form of a matter wholly similar to natural rubber and it can be vulcanized in the same manner. This vulcanizable mass is soluble in all the known solvents of rubber, and it is precipitated from its solution by alcohol and acetone and it can be employed for all applications of natural rubber, from dissolution and use as an elastic matter to vulcanization into the hardest possible state.

Example

In an autoclave, or any other closed and heated vessel provided with stirring blades, I pour, for instance, 5000 grammes of a mineral oil, or a coal or lignite tar oil.

After heating at a temperature of 112° C., I add 350 grammes of crude sulphur.

The whole is heated for 16 hours at a temperature ranging between 70 and 112° C., then 400 grammes of colophony or resin oil are added. The temperature is maintained at a value of 50° C. for three hours and 1200 grammes of diluted sulphuric acid of 34° Baumé are added gradually.

The heating is then stopped, the acid supplying the required heat.

The whole is stirred for a period of time of four hours and 750 grammes of commercial hydrochloric acid are added. The whole is then again stirred for a period of time of four hours, and subsequently left alone for a period of time ranging from twenty-four to forty-eight hours.

Then the mass is neutralized by means of a base, for instance caustic soda, the necessary amount being about 600 grammes of soda in the form of flakes. Neutralization is preferably effected on calenders, either in the hot or in the cold state.

By washing, I remove the compounds resulting from the introduction of the base, for instance the sodium sulphate that has been formed.

Finally, the neutralized and washed mass is dried as above explained, in a drying apparatus, up to a temperature which may be as high as 102° C., and which is maintained for about 5 hours so as to evaporate the whole of the water. The drying operation is pursued for 70 hours. The mass that is obtained is spongy and can be calendered.

While I have, in the above description, disclosed what I deem to be a practical application of the present invention, it should be well understood that I do not wish to be limited thereto as there might be changes made in the specific details of the process without departing from the principle of the present invention as comprehended within the scope of the appended claims.

What I claim is:

1. A method of obtaining artificial rubber, which comprises treating a mineral oil with sulphur and a substance selected from the group consisting of rosin, rosin oil and pitch, at a temperature ranging between 100 and 125° C., adding sulphuric acid and subsequently hydrochloric acid, neutralizing the product thus obtained, and drying.

2. A method of obtaining artificial rubber, which comprises treating petroleum oil with sulphur and a substance selected from the group consisting of rosin, rosin oil and pitch, at a temperature ranging between 100 and 125° C., adding sulphuric acid and subsequently hydrochloric acid, neutralizing the product thus obtained, and drying.

3. A method of obtaining artificial rubber, which comprises treating coal tar oil with sulphur and a substance selected from the group consisting of rosin, rosin oil and pitch, at a temperature ranging between 100 and 125° C., adding sulphuric acid and subsequently hydrochloric acid, neutralizing the product thus obtained, and drying.

4. A method of obtaining artificial rubber, which comprises treating lignite tar oil with sulphur and a substance selected from the group consisting of rosin, rosin oil and pitch, at a temperature ranging between 100 and 125° C., adding sulphuric acid and subsequently hydrochloric acid, neutralizing the product thus obtained, and drying.

5. As a new product, the reaction product of a mineral oil with sulphur and a substance selected from the group consisting of rosin, rosin oil and pitch, after treatment by sulphuric acid and hydrochloric acid, neutralization and drying.

6. As a new product, the vulcanized reaction product of a mineral oil with sulphur and a substance selected from the group consisting of rosin, rosin oil and pitch, after treatment by sulphuric acid and hydrochloric acid, neutralization and drying.

7. A method of obtaining artificial rubber, which comprises treating a mineral oil with sulphur and rosin at a temperature ranging between 100° and 125° C., adding sulphuric acid and subsequently hydrochloric acid, neutralizing the product thus obtained, and drying.

8. A method of obtaining artificial rubber, which comprises treating a petroleum oil with sulphur and rosin at a temperature ranging between 100° and 125° C., adding sulphuric acid and subsequently hydrochloric acid, neutralizing the product thus obtained, and drying.

9. A method of obtaining artificial rubber, which comprises treating a coal tar oil with sulphur and rosin at a temperature ranging between 100° and 125° C., adding sulphuric acid and subsequently hydrochloric acid, neutralizing the product thus obtained, and drying.

10. As a new product, the reaction product of a mineral oil with sulphur and rosin, after treatment by sulphuric acid and hydrochloric acid, neutralization and drying.

ERNST KLEIBER.